United States Patent [19]
Campbell

[11] 3,716,134
[45] Feb. 13, 1973

[54] APPARATUS FOR AUTOMATICALLY TESTING AND SORTING ELECTRICAL ELEMENTS

[75] Inventor: Robert D. Campbell, La Crescenta, Calif.

[73] Assignee: San Fernando Electric Manufacturing Co., San Fernando, Calif.

[22] Filed: March 8, 1971

[21] Appl. No.: 122,028

[52] U.S. Cl. ..................209/73, 209/74 M, 209/75, 209/81, 214/1 BH, 137/625.12
[51] Int. Cl. ..............................................B07c 5/344
[58] Field of Search ....209/73, 74, 81, 75; 214/1 BH; 132/625.12

[56] References Cited

UNITED STATES PATENTS

| | | | |
|---|---|---|---|
| 3,392,830 | 7/1968 | Broderick et al. | 209/73 |
| 3,353,669 | 11/1967 | Broderick et al. | 209/73 |
| 3,047,933 | 8/1962 | Chick et al. | 214/1 BH |
| 3,616,942 | 11/1971 | Gruber | 214/1 BH |

*Primary Examiner*—Allen N. Knowles
*Attorney*—Perry E. Turner

[57] ABSTRACT

Electrical elements are moved by vibrator apparatus to a position below a multi-arm having a plurality of circumferentially spaced pickups to which respective tubes are connected. The spider is on a post that is moved in steps, and at the end of each step is raised and lowered. Via a control element around which the spider moves, each pickup tube is connected to a vacuum source as it reaches a pickup station, so that it captures a single element, and is maintained on vacuum through a test station to a drop station, where the vacuum is cut off and the element is released and directed to a receptacle selected as a result of a measurement previously made at the test station. Test contact arrangements shown include spaced spring contacts on nonconductive discs releasably mounted on a post, and spaced contacts wherein one is mounted on such a disc and the other is on the pickup. For the latter, connection to a stationary terminal is effected through a respective wiper for each contact carried by the spider structure. Also shown is photoelectric detection and associated air blast apparatus for returning components to the vibrator which do not have predetermined light reflective surfaces facing upward.

9 Claims, 21 Drawing Figures

PATENTED FEB 13 1973

INVENTOR.
ROBERT D. CAMPBELL
BY Jerry E. Turner
ATTORNEY

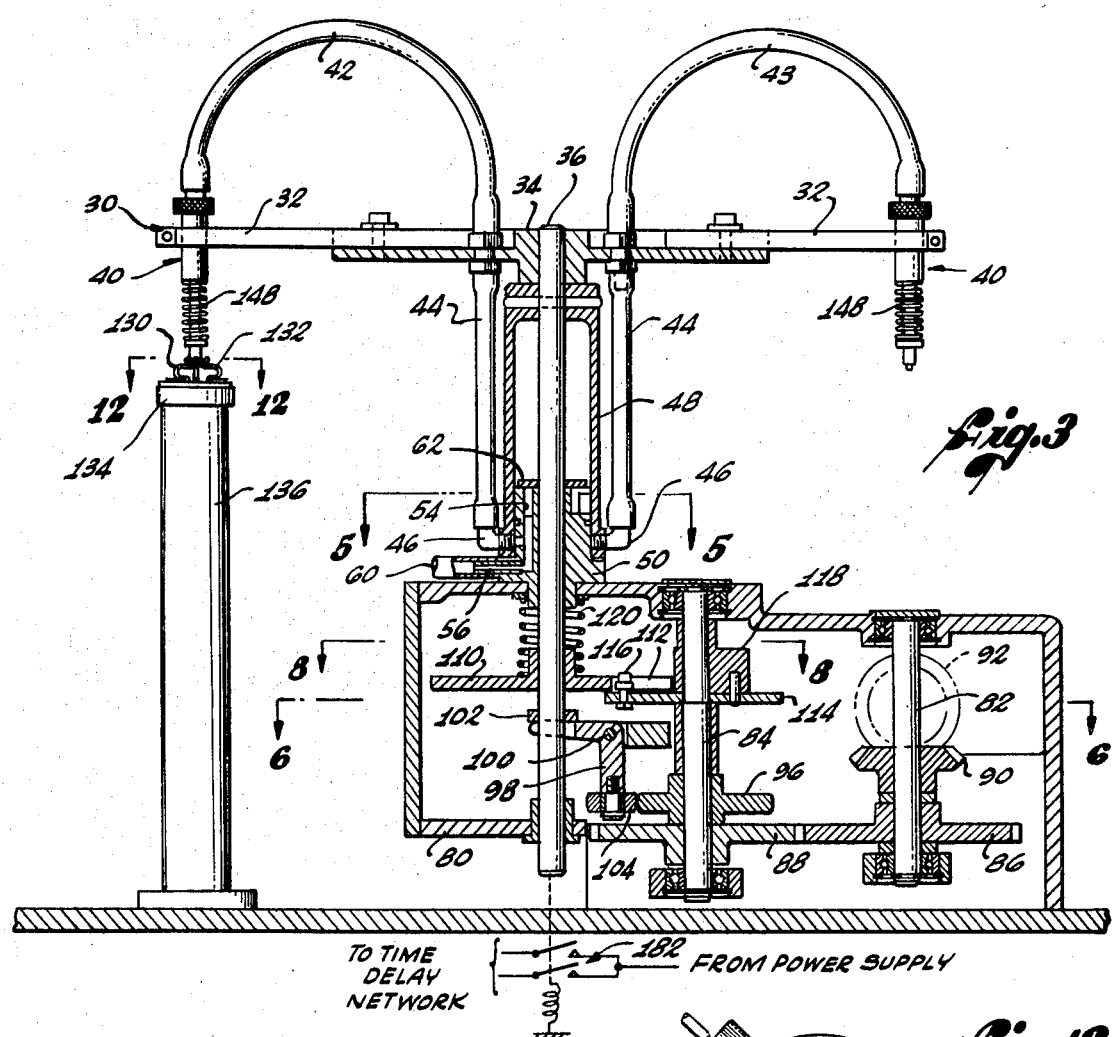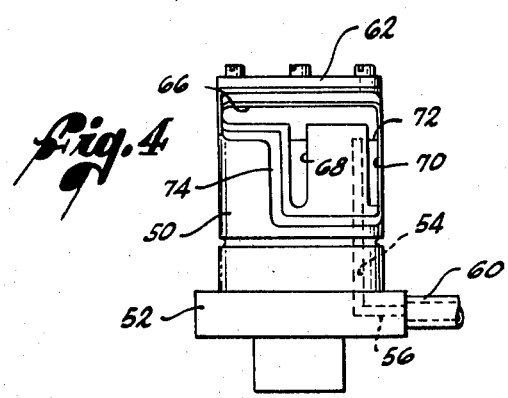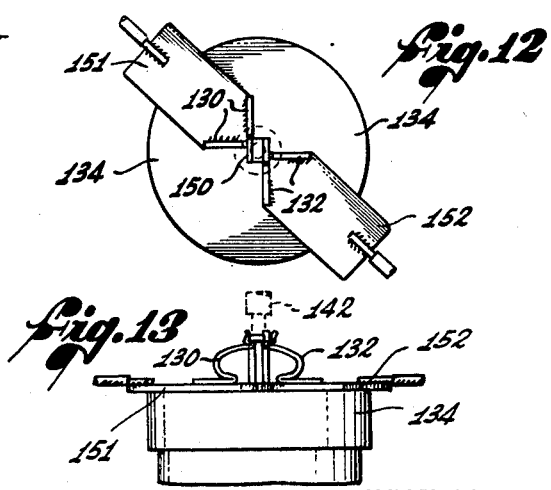

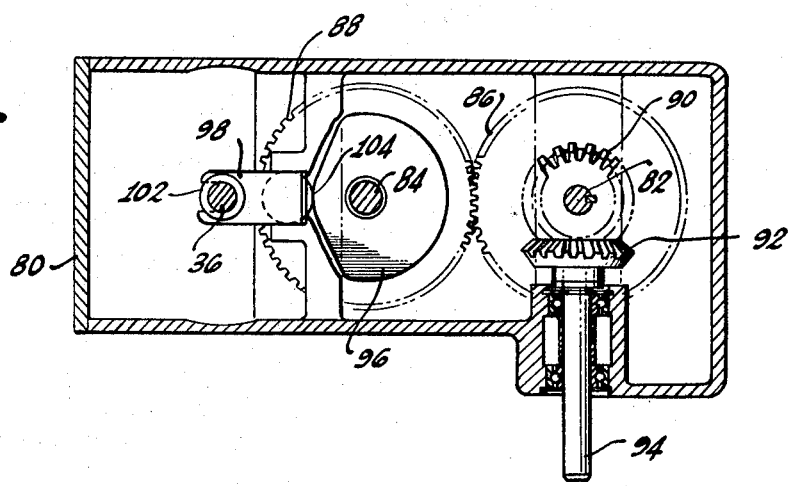
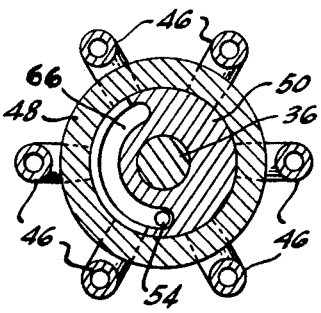
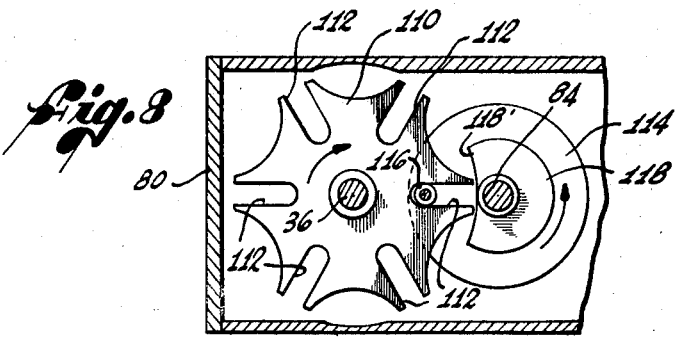
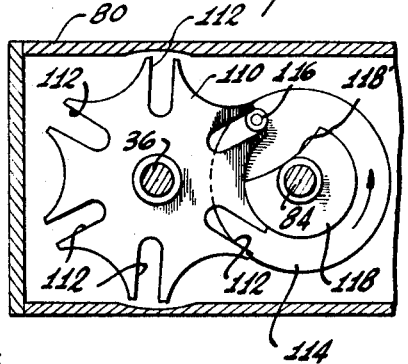
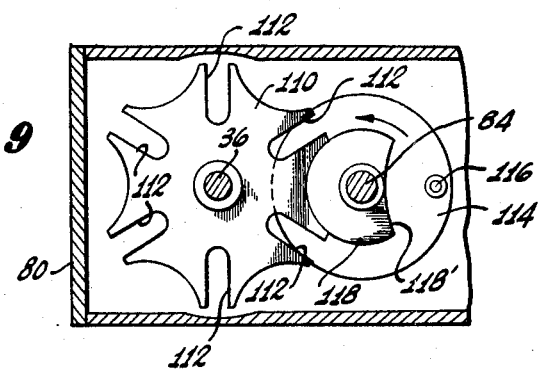

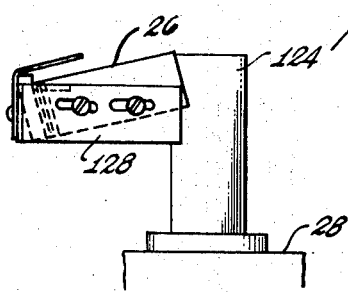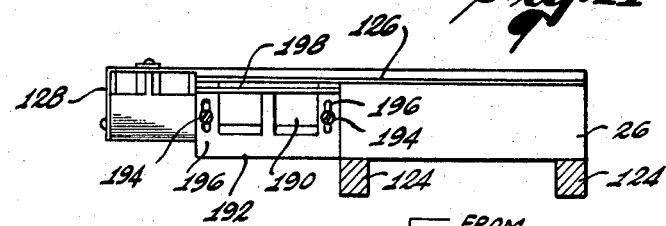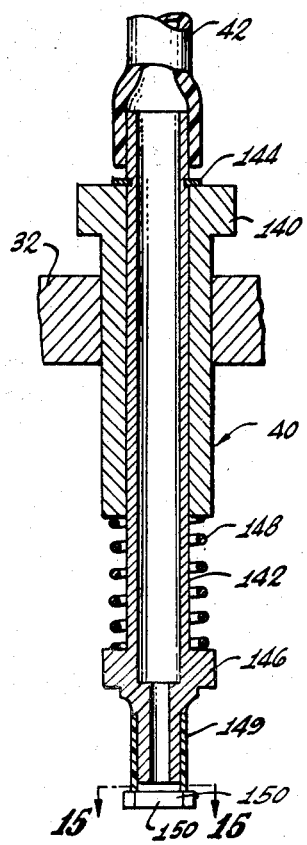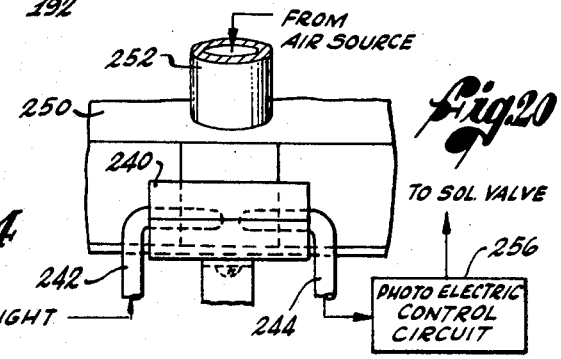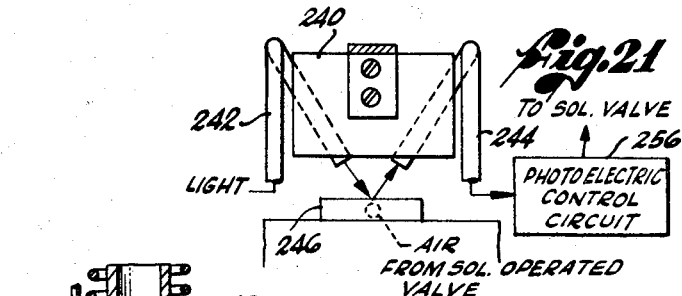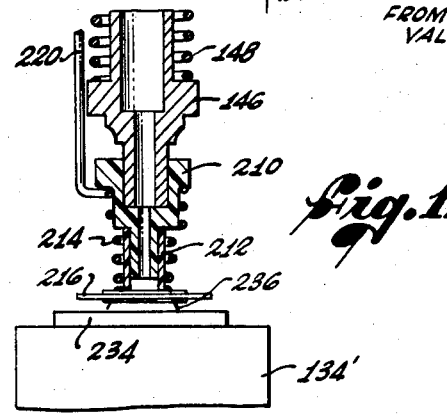

INVENTOR.
ROBERT D. CAMPBELL
BY Perry E. Turner
ATTORNEY

APPARATUS FOR AUTOMATICALLY TESTING AND SORTING ELECTRICAL ELEMENTS

BACKGROUND OF THE INVENTION

1. Field of the Invention

This invention relates to apparatus for automatically testing and sorting electrical elements.

2. Description of the Prior Art

It is known to move components such as ceramic capacitor chips via a vibrator to a platform under a pair of vertically movable test contacts that are carried on the upwardly biased piston of an air cylinder. As disclosed in U.S. Pat. No. 3,534,853, for "Automatic Testing and Sorting Apparatus for Electrical Elements," issued Oct. 20, 1970, and assigned to the same assignee as the present application, the piston moves down to bring the contacts against respective conductive coatings of each chip placed on the platform. A voltage measurement results in a sorter tube being moved below a chute, and a movable shuttle plate kicks the chip off the platform and into the chute to be directed through the sorter tube to a respective bin.

With such apparatus, contact wear, piston friction and changes in spring characteristics occasionally result in incorrect chip measuring and sorting operations. To minimize such occurrences and their undesirable effects, it is necessary to make piston stroke and biasing spring adjustments from time to time. Also, to test and sort chips of different sizes on different runs, it is necessary to replace both the shuttle plate and movable contacts along with associated supporting structures. Further, due to the force with which the piston causes the contacts to exert on the components, such apparatus is not suited to testing and sorting extremely fragile elements, e.g., a capacitor formed of a single thickness of ceramic with plates formed of metal films deposited on its opposite surfaces.

SUMMARY OF THE INVENTION

This invention embraces apparatus with pickups utilizing vacuum to select elements successively from a vibrator, each pickup carrying its element to a measuring station and then to a drop station where it is released by cutting off the vacuum, and wherein such apparatus requires a minimum of adjustment and maintenance operations and cannot damage the elements.

BRIEF DESCRIPTION OF THE DRAWINGS

FIG. 3 is a sectional view of the apparatus of FIG. 1 taken through the center of the spider from the right-hand side of FIG. 1;

FIG. 4 is a side elevation view of the vacuum control element of the apparatus;

FIG. 5 is a sectional view taken along the line 5—5 of FIG. 3;

FIG. 6 is a sectional view taken along the line 6—6 of FIG. 3;

FIG. 6–9 are fragmentary sectional views taken along the line 8—8 of FIG. 3, showing the elements involved in different positions;

FIG. 10 is an end view of the in-line feeder;

FIG. 11 is a bottom view of the in-line feeder;

FIG. 12 is a top plan view of the contacts and supporting posts at the test station, as viewed along the line 12—12 of FIG. 3;

FIG. 13 is a fragmentary side elevation view of the post and contacts thereon, showing a capacitor chip lowered into engagement with the contacts;

FIG. 14 is a longitudinal sectional view of one of the pickups;

FIG. 15 is a sectional view taken along the line 15—15 of FIG. 14;

FIG. 17 is a sectional view of the lower portion of a pickup modified to adapt the apparatus for measuring wafter capacitors, wherein a conductive spring carried by the pickup is one of the contacts used in making a measurement, and showing a lead from the upper end of the spring for connection to a wiper on the spider;

FIG. 20 is a top view of a block supporting optical fibers above the in-line feeder, such fibers being connected to a light source and to a control circuit for a solenoid valve for controlling an air blast to be directed against an element on the in-lie feeder, such valve being operable in response to a predetermined light reflective characteristic of the element to direct the air blast against the element and remove it from the feeder; and FIG. 21 is an end view of the apparatus of FIG. 20.

DESCRIPTION OF ILLUSTRATIVE EMBODIMENTS

Figure 1:
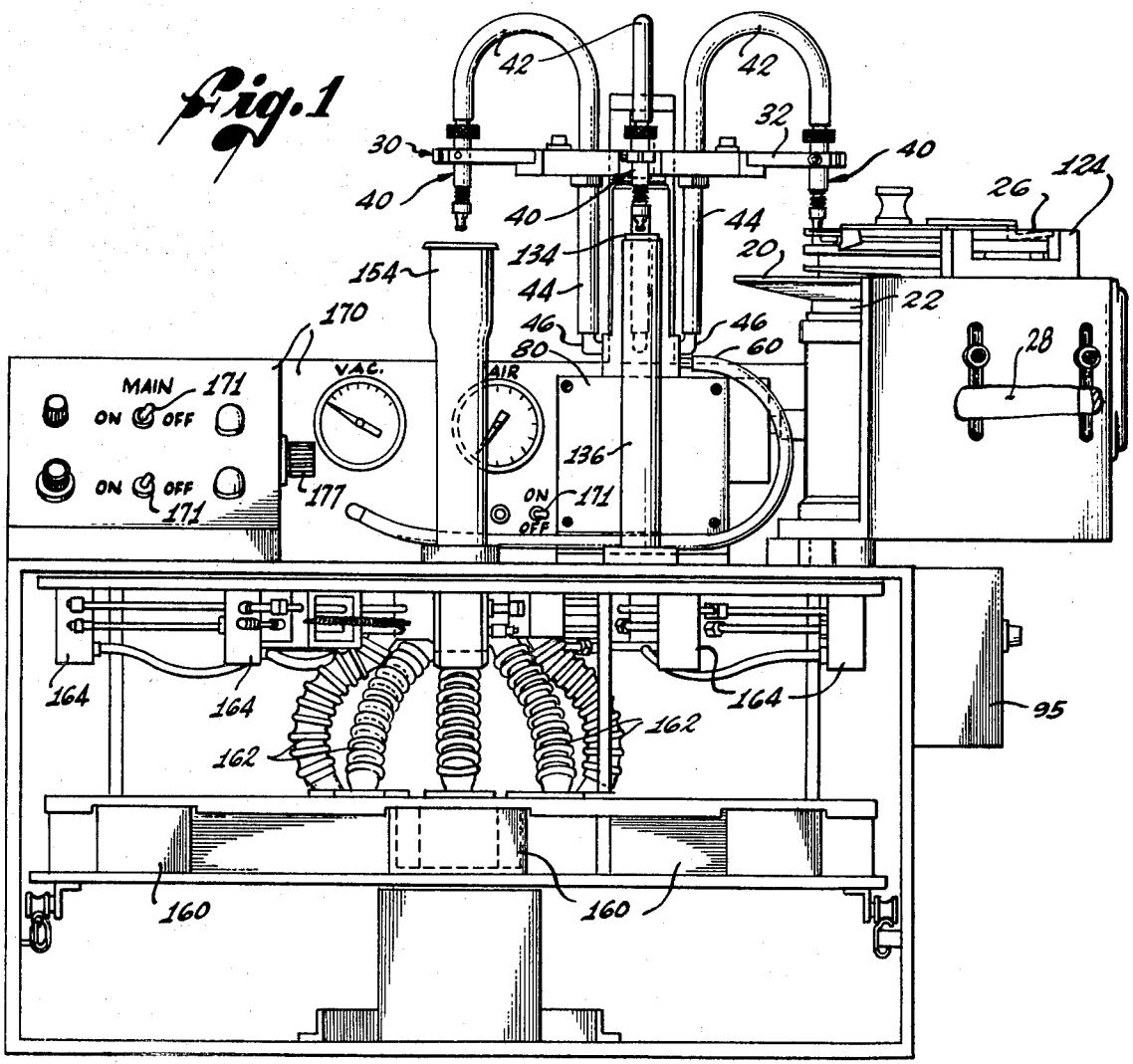
FIG. 1 is a front elevation view of automatic testing and sorting apparatus in accordance with the invention.
Figure 2:
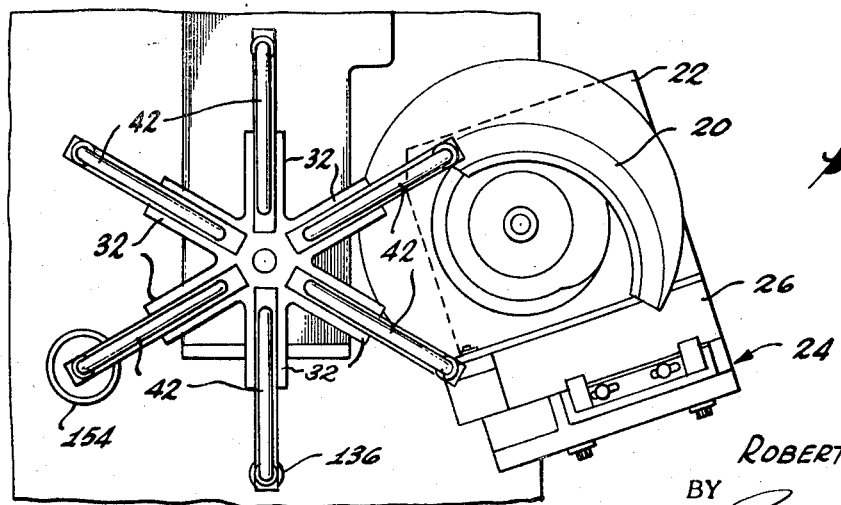
FIG. 2 is a top plan view of the spider and vibrator devices of FIG. 1.

Referring to FIGS. 1–3, components such as a quantity of capacitor chips to be tested and sorted are placed in a feeder bowl 20 that is supported on a vibrator unit 22. The bowl has a spiral ramp extending from its floor, and the vibrator causes the chips to move from the floor to the top of the ramp.

Chips reaching the top of the ramp move directly onto and along a vibrated in-line feeder 24 which is in the form of a block 26 that is supported on the upper end of a vibrator 28. In this connection, chips reaching the upper end of the bowl ramp are moving in a curved path. The in-line feeder 24 changes such curving motion to straight line motion. The vibrator 28 causes the chips to move to the outer end of a feeder plate 26, from which they are successively removed, tested, and sorted.

Vacuum means is utilized to remove each chip from the feeder plate block 26 and to carry it successively to a test probe station where its capacitance is measured, and to a drop station where it is released and directed to a selected bin. For such vacuum means there is shown a spider 30 having a plurality of arms 32 extending from a hub 34 that is mounted on the upper end of a rotatable and vertically movable post 36 (FIG. 3). Extending through the outer ends of the arms 32 are respective vacuum pickups 40. For each pickup a respective pair of conduits 42, 44 are connected through the associated spider arm between the pickup and a respective nipple 46 connected to the lower end of an inverted cup 48 which is staked at its upper end to the post 36.

Fitted within the lower end of the cup 48 is a cylindrical block or body 50 having a flange 52 which is slidably engaged by the lower end of the cup 48. Referring to FIGS. 4 and 5 along with FIG. 3, a vertical port 54 extends through the block 50 and is intersected at its lower end by a horizontal port 56 in the flange 52, and to which a vacuum line 60 is connected. The upper end of the vertical port 54 is closed by a cap 62 on the top of the block.

The block 50 is shaped so that as the post 36 and spider 30 are rotated, two of the pickups 40 are in fluid communication with the vacuum source. To this end, and as best seen in FIGS. 4 and 5, the face of the block 50 adjacent its upper end is provided with an arcuate groove 66, the lower wall of which is interrupted by vertical grooves 68, 70, the centerlines of which are displaced 60° in this example. Further, the radial depth of the groove 66 is greater than that of the grooves 68, 70, and inwardly of the lower wall from which the grooves 68, 70 extend, the groove 66 is made axially deeper to provide a ledge 72. The vertical port 54 extends to the radial face of the ledge 72. The face of the block 50 is provided with an O-ring type seal 74 that is fitted in a groove that encompasses the grooves 66, 68, 70.

The separate grooves 68, 70 aid in explaining operation, but a single groove spanning these will suffice. For a block of metal, I mill an arcuate groove in its upper end to the depth of the ledge 72, form the face grooves, drill the vertical port 54 through the ledge, and seal the cap 62 to the top of the block.

Rotational movement of the post 34, cup 48 and six-arm spider is effected by 60° increments which are separated by a predetermined delay. Further, the post and spider are raised during rotational movement, and are lowered during the delay periods. As shown in FIG. 3, the lower end of the post 36 is journaled for rotation in a housing 80. Within the housing are spaced rotatable shafts 82, 84 which have meshing gears 86, 88 on their lower ends. The shaft 82 is the driving shaft, and is provided with a spur gear 90 for meshing engagement with a similar gear 92 that is carried on the shaft 94 (FIG. 6) of a drive motor 95 (FIG. 1).

For raising and lowering the post 36, the shaft 84 carries a cam 96 for operating a lever 98 that is pivotally supported at 100 by the housing. The other end of the lever straddles the post 36 and engages a ring 102 secured to the post.

In the illustrated arrangement, the end of the lever that is operated by the cam 96 preferably carries a roller 104 to be engaged by the cam. In the position of the parts shown in FIG. 3, the post is lowered. The cam is shaped so that the post remains lowered for a predetermined period, and then is raised as the cam rotates to force the lever 98 clockwise, whereby the ring 102 and the post 36 are raised. It will be noted in FIG. 6 that somewhat more than a semicircular portion of the cam 96 is of constant radius, whereby the post is held in the raised position throughout a substantial portion of each revolution of the cam.

Rotation and lowering of the post are effected through a Geneva movement mechanism. Referring to FIGS. 7–9 along with FIG. 3, the mechanism for the purpose of this illustration includes a plate 110 secured to the post 36, such plate having radial slots 112 sixty degrees apart. The shaft 84 carries a disc 114 having an upstanding roller pin 116 adapted to enter the slot 112 for effecting rotation of the plate 110. Also positioned on the shaft 84, and rotatable with the disc 114, is an element 118 shaped substantially as a two-thirds cylinder having an arcuate face 118'. The roller pin 116 is on a radial line that bisects the face 118'.

It will be noted that the periphery of the plate 110 intermediate the slots 112 is inwardly curved, and that the radius of curvature of such portions is the same as that of the element 118. As will be seen by inspection of FIGS. 7–9, the element 118 and disc 114 cooperate to effect entry of the roller pin 116 into each slot 112 to effect a 60° turn of the plate 110 for each revolution of the disc 114. Further, it will be seen that the plate 110, and hence the post 36, does not rotate during the portion of the revolution of the disc 114 during which the roller pin 116 emerges from one slot and enters the next slot.

As noted, the post 36 is raised during rotation intervals and lowered between such intervals. A compression spring 120 (FIG. 3), preferably with end thrust bearings (not shown), is disposed above the plate 110. When the radius of the cam 96 decreases to permit return (counterclockwise) movement of the lever 98, the spring 120 forces the plate 110, and hence the post 36 and ring 102 thereon, downwardly to permit the roller 104 to follow the decreasing cam dimensions.

The parts above described are arranged so that the arms of the spider 30 are aligned with the slots 112 in the plate 110. Thus, the spider is lowered when the plate 110 is stationary, and is raised while the plate is rotated. As will be apparent, the cam 96 is shaped to insure that the spider is raised immediately before the plate 110 undergoes rotation.

Referring to FIGS. 10 and 11 along with FIGS. 1 and 2, the feeder plate block 26 is inclined inwardly, and is thus held by a vertical support 124 that is secured to the top of the vibrator 28. The inner edge of the feeder plate block 26 has a raised lip, which is provided in this case by a thin plate 126 secured to the body of the plate. Thus, chips moving onto the feeder plate 26 ride against the lip. At its outer end, the feeder plate 26 has a stop, shown as a plate 128 secured to the end of the block 26, which prevents the chips from moving off the end of the block 26. It is immediately adjacent this stop that each pickup 40 is lowered to allow a single chip to be picked up thereby. Then the spider 30 is raised and rotated 60°, where it is again lowered.

The chip thus picked up is brought into engagement with spaced contacts 130, 132 (FIGS. 12 and 13) carried by a nonconductive disc 134 on the top of a post 136. Simultaneously, the next succeeding pickup 40 captures the next succeeding chip that moves against the stop at the end of the feeder plate 26.

At this point, reference is made to FIGS. 14 and 15 along with FIGS. 1–3 to explain the structure and functioning of the pickups 40. As best seen in FIG. 14, the pickup comprises a flanged tubular element 140 extending through the spider arm 32, and a tubular plunger 142 slidable in the tubular element 140. The conduit 42 is fitted on the upper end of the plunger 142, and a snap ring 144 on the plunger limits its downward movement through the element 140. Below the end of the tubular element 140, the plunger 142 is provided with a flange, and a compression spring 148 extends between such flange and the lower end of the tubular element 140.

Below its flange, the plunger is necked down and fitted with a plastic sleeve 140 that extends below the lower end of the plungers. The outer diameter of the sleeve 149 preferably is encompassed within the boundaries of a chip 150 captured thereby. For example, for chips 0.040-in. square, or a rectangular chip 0.040-in. wide, the lower end of the sleeve 149 has an outer diameter of 0.025-in., and an inner diameter of 0.013-in. The reason for this is that the suction is directly applied to the chip contacted by the sleeve, i.e., the sleeve is small enough so that it cannot pick up an adjacent chip.

The chip 150 in the example shown is square, and is formed in a conventional manner with metallized coatings for connecting alternate plates therein together. The contacts 130, 132 are carried on metal plates 151, 152 which are adapted for connection to a measuring network. To insure firm contact with the chip, the contacts 130, 132 are formed of spring metal, and are preferably shaped so they are forced downwardly by and against the edges of a chip. In the arrangement shown, the contacts 130, 132 are arranged in pairs with spring ends at right angles. Accordingly, when a chip 140 is lowered to engage the contacts, diagonally opposed corners of the chip enter between the contact pairs. Therefore, regardless of the orientation of the chip, each metallized surface is engaged by a respective one of the contact pairs.

The force with which a chip is held on the end of the plunger is greater than the spring force exerted on the edges of the chip by the contacts. Accordingly, the chip is retained on the end of the plunger on the next succeeding upward motion thereof. Following such upward motion, the spider is again rotated 60° and lowered again. At this point, the plunger which had just removed its chip from the contacts 130, 132 is disconnected from the vacuum source. Also, such plunger is positioned over a chute 154 (FIG. 1), whereby the chip drops through the chute and is directed therefrom into a bin. Simultaneously, the next succeeding pickup has lowered its chip onto the contacts 130, 132 and the next following pickup is connected to the vacuum source and has picked up a chip from the feeder plate 26. The sequence of operations thus continues.

Maintaining each pickup in connection with the vacuum source from the pickup position to the drop position is effected through the slots and grooves in the block 50 heretofore described. When the pickup reaches the pickup position, the associated nipple 46 is in fluid communication with the portion of the slot 66 above the slot 70 (see FIGS. 4 and 5). When the pickup is lowered, such nipple remains aligned with the slot 70 and is hereby maintained under vacuum. When the pickup is raised and rotated to the test contact position, the associated nipple rises in alignment with the slot 70, then rotates in alignment with the slot 66, and is lowered in alignment with the slot 68, whereby it is constantly connected to the vacuum source throughout such up and down movements. On the next succeeding operation, the associated nipple is raised in alignment with the slot 68, and then rotated in alignment with the slot 66. At the end of such rotational movement, the associated nipple rides past the end of the slot 66 and the surrounding seal 74, whereby it is cut off from the vacuum source. Thus, a chip on the end of a pickup is held thereon by vacuum, and is released immediately upon the vacuum being cut off.

It should be noted that the pickups are arranged to avoid damaging chips against which they are lowered. When the plunger sleeve 149 contacts a chip on pickup, the spider continues downward movement. Total vertical travel of the spider in one example is about 0.375-in., and the sleeve 149 contacts the chip approximately 0.1-in., before the spider completes its downward movement. The spring 148 insures that during downward movement of the pickup towards the chip, the plunger is held with its snap ring 144 against the top of the tubular element 140. When the sleeve 149 contacts the chip and the spider arm continues down, the momentary forces necessary to overcome the friction and permit such sliding movement are cushioned so as not to be imparted to the chip to damage it. The spring operates the tubular element 140 and plunger 142 to insure that the sleeve 149 is not pressed against the chip with any damaging force while such breakaway frictional force is overcome. At this moment, the upper end of the tubular element moves clear of the snap ring 144.

The same advantages are present when a chip is lowered against electrical contacts at the measuring station. Additionally, where the contacts are spring elements, the chip is enabled to move them into engagement with it while being cushioned by the contacts themselves.

As previously mentioned, chips dropped into the chute 154 are directed to selected bins. FIG. 1 shows a plurality of spaced bins 160, each with a respective conveyor tube 162 coupled at its lower end to the bin, and having its upper end horizontally movable via the piston of an air cylinder 164. Such a bin arrangement, and the operation thereof via solenoid valves, is described and claimed in U.S. Pat. No. 3,543,853, Forest I. Seaman, for "Automatic Testing and Sorting Apparatus for Electrical Elements," issued Oct. 20, 1970 and assigned to the same assignee as the present application. Reference can be made to said patent for the complete description of the structure and operation of such apparatus.

In accordance with the present invention, sorter tube operation is effected at the time that a chip is lowered onto the contacts 130, 132 and a measurement of its capacitance value range is made. The upper end of the sorter tube thus selected remains beneath the chute 154 throughout the period that the chip is raised from the contacts and dropped through the chute 154. Such sorter tube is immediately retracted and, pursuant to the measurement being made on the next succeeding chip that has been lowered onto the contacts, the next succeeding sorter tube selection is made to place the upper end thereof below the chute 154 to receive that chip when it is dropped.

Figure 16:
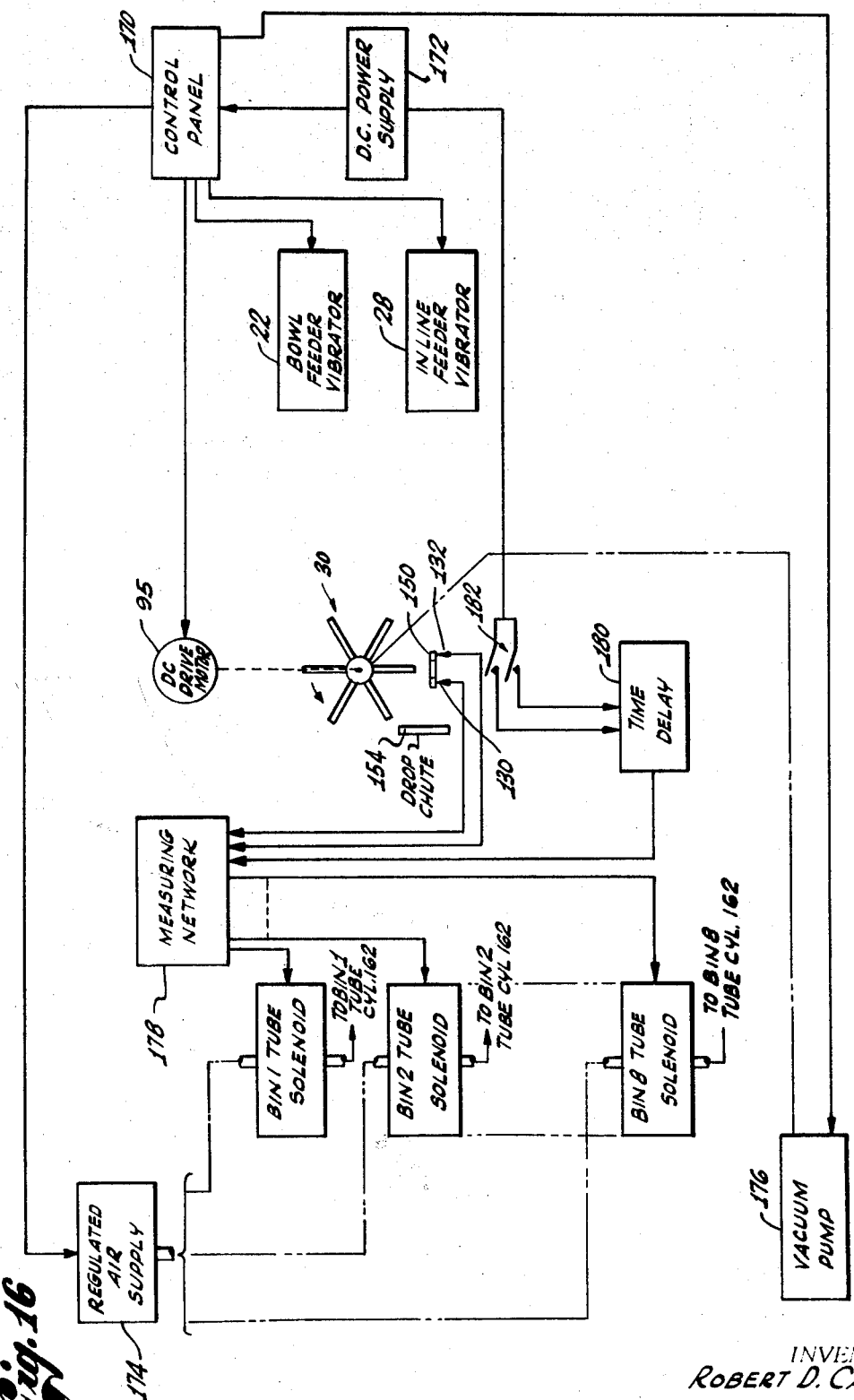
FIG. 16 is a block diagram of the electrical control system for solenoid valves used to control pneumatic operations of sorter tubes, for the feeder vibrators and spider drive motor, and showing schematically the air line connections to and from various solenoids and the vacuum line connection to the spider structure.

System operation will now be explained with reference to FIG. 16 along with FIGS. 1–3. A control panel 170 has appropriate control switches 171 through which to apply power from a source 172 to the drive motor 95 for the spider 30, the regulated air supply 174 for the various sorter tube air cylinder, and the vacuum pump 176, and knobs 177 through which to control power applied from the source to the vibrators 22, 28. The capacitor measuring network is shown at 178 with respective output connections to the coils of the sorter tube solenoids for the various bins 160 (here illustrated as eight bins numbered 1, 2, . . . . 8). The test contacts 130, 132 are connected to the network 178 as is a time delay network 180, which is coupled via normally open switches 182 to the power supply 172. As illustrated in FIG. 3, the contacts 182 are adapted to be closed by the post 36 each time it is lowered.

The capacitor measuring network 178 includes comparison means and standard capacitor means against which the values of the chips are to be compared. The capacitor standard may be a single capacitor, in which case the measuring network is adapted to develop signals for successive capacitor chips which illustrate the difference between the capacitances of each chip and the standard. The sorter tube that is operated by the network will be determined by the difference, whereby chips with eight capacitance ranges are directed to appropriate bins. Or if desired, the capacitor standard may include eight standard capacitors of respective values of capacitance. In such case, the network operates the sorter tube that is to receive chips which have capacitance values closest to one of the standard values. In either case, any chip that exhibits capacitance outside an acceptable range will result in no sorter tube being operated, whereby such chips drop through the chute to a center bin provided for them.

The time delay network 180 effectively delays the application of power to the comparison means within the network 178 by a period corresponding to the delay in moving a chip from the test contact station to the drop station. In this connection, each measurement in succession occurs when the preceding chip is released above the chute 154. The network 178 had operated to cause the appropriate sorter tube to move under the chute immediately after the preceding measurement was made. For the chip currently at the test station, the network 178 measures its capacitance, releases the sorter tube currently under the chute — and into which the preceding chip has passed — and generates the command to position the next sorter tube under the chute. This will be the same sorter tube if the measurement is the same as for the preceding chip. This process continues, and at a rate corresponding to the spider movement.

In this latter connection, the system is capable of adjustment to vary the rate at which measurements are made. By controlling the speed of the drive motor, the spider in one arrangement has been operated to cause only three chips per minute to be selected, measured and sorted, and fast enough to select, measure and sort 100 chips per minute.

The invention is adapted to accommodate electronic components of various sizes. At the test station, contacts of the proper size are provided for the particular run of chips. For chips of markedly different sizes, each of an array of nonconductive discs 134 is provided which has mounted thereon spring contacts adapted to accommodate chips of a respective size. Such discs are adapted to be removably mounted on the post 136, whereby they can readily be changed as needed and connected to the leads to the network 178.

The test probe contacts may be of any shape suitable for the desired purpose. For example, each of the contacts 130, 132 may comprise a pair of contact elements mounted on separate conductive plates mounted at right angles on the nonconductive disc, and wherein the conductive plates of each pair are connected together by a short bar or strap. Also, conductive plates may be deposited on the nonconductive disc, and the contacts welded to such conductive layers.

Referring again to FIGS. 10 and 11, the inline feeder 24 not only effects straight line movement of the chips, but is adapted to effect return to the vibrator bowl of chips which are not oriented properly as they move along the lip 126, and to cause each chip to assume a horizontal position as it engages the stop plate 128. For returning disoriented chips to the feeder bowl, the block 26 has an opening or slot 190 adjacent the plate 126. The lower surface of the block 126 has a recess in which an adjustable block 192 is located, and which is connected to the block 26 via screws 194 extending through elongated slots 196. Fastened to the inner end of the block 192 is a plate 198. The screws 194 are tightened in the position of the block 192 for the desired spacing between the plates 198 and 126.

For square chips, such spacing is greater than the thickness but less than the dimension of an edge thereof. Thus, any chips which do not span the space between the plates 126, 198 are caused to fall between them and back into the feeder bowl. For rectangular chips which are metallized on their ends, and which are to move along the plate 126 with on metallized end engaging it, the spacing between the plates 126, 198 is greater than the width of the chips. Accordingly, any chip that is oriented at 90° from the desired position will fall between the plates and back into the feeder bowl.

The end position of the block 126 onto which the stop plate 128 is secured is horizontal. The plate 128 extends above the surface of this portion of the block so that a chip engaging it is maintained in position. If desired, the portion of the block immediately adjacent the stop plate 128 may be provided with a small recess into which the chip settles. Accordingly, when the vertically movable spider is lowered to bring a pickup down at this point, the lower end of the plastic tube 149 is in position to effect surface-to-surface contact throughout with the chip. Accordingly, successive chips in a given run are engaged at the same positions by the pickups.

The invention is also adapted to test fragile capacitor wafers, such as a thin layer of ceramic on which plates in the form of conductive films are deposited on its opposite surfaces. Such wafers are vibrated and moved to the pickup station in the same manner as the capacitor chips above described. They are also picked up and moved to the test station and thence the drop station in the same manner. However, testing is effected through a fixed contact mounted on the post 136 and a contact carried by the pickup.

Referring to FIG. 17, a tubular element 210 is attached to the lower end of the plunger 146, and is fitted with a plastic sleeve 212 corresponding to the plastic sleeve 149 previously described. A conductive compression spring 214 is fitted around the attachment 210, and normally extends slightly below the lower end of the plastic sleeve 212. At the pickup station, the lower end of the spring 214 engages the wafer 216 and is thereby compressed slightly when the suction force causes the wafer to adhere to the lower end of the sleeve 212. Further, the spring 214 is dimensioned so that its lower end engages one plate of the wafer. The suction force is sufficiently great that the force of the spring 214 cannot dislodge the wafer from the lower end of the sleeve 212.

Figure 18:
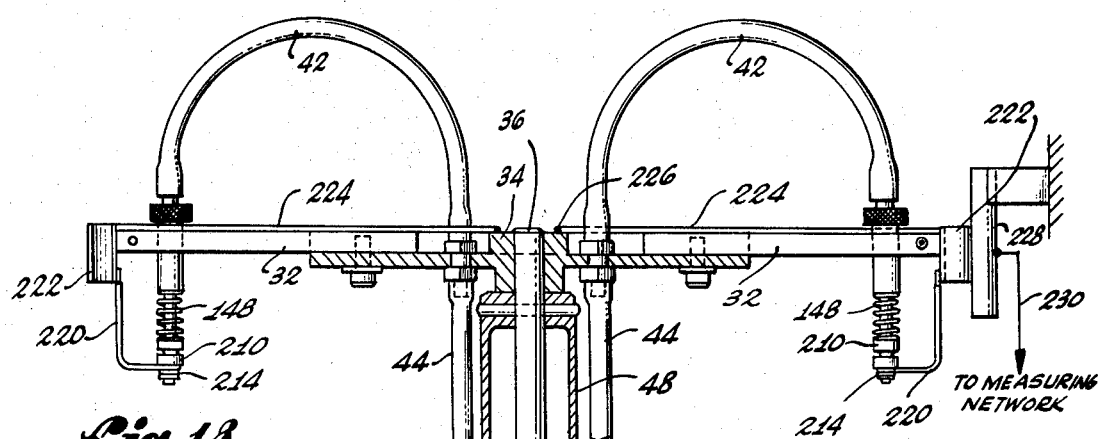
FIG. 18 is a side elevation view of the spider showing the arrangement of leads carried by the spider arms to wipers at the ends thereof for engaging a stationary contact.
Figure 19:
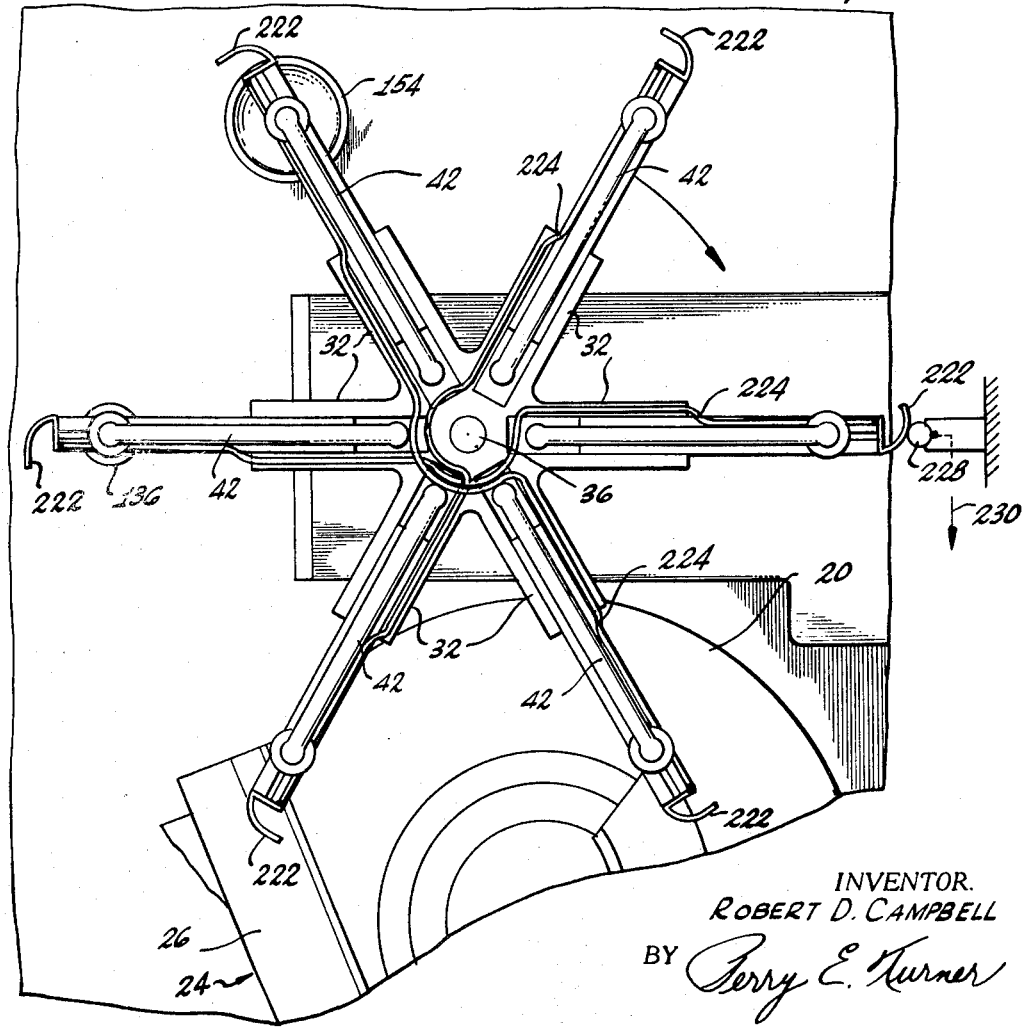
FIG. 19 is a top plan view of the spider.

Referring to FIGS. 18 and 19 along with FIG. 17, each of the springs 214 is connected via a respective lead 220 to a wiper contact 222 at the end of the spider arm on which the pickup is carried. The pairs of spider arms on the same diameters carry respective leads 224 connected to the wiper contacts thereon. Thus, the diametrically opposed wipers 222 and conductive springs 214 are electrically connected together.

The wipers 222 are adapted to engage a stationary contact 228, which is connected at 230 to the measuring network. Each wiper that engages the stationary contact remains in slidable contact therewith while the spider is lowered and raised as previously described.

At the test station, the wafer 216 is lowered against a contact 234 carried on a nonconductive disc 134 that is fitted on the post at that station, and which is connected at 236 to the measuring network. Since the diametrically opposed wipers and conductive springs are electrically connected together, this arrangement causes the plates of each wafer lowered at the test station to be connected to the measuring network via the stationary contacts 228, 234. The network functions as previously described to cause a sorter tube to be positioned under the chute for receiving the wafer when it is released at the drop station.

This invention also includes means for effecting proper orientation of elements such as ceramic resistors, wherein metallized terminals are on the same surface as the resistive film. In measuring the resistance of such a chip with the apparatus of FIGS. 1–15, it is necessary that the chip be positioned on the contacts 130, 132 with the resistive face down.

FIGS. 20, 21 illustrate detection means for permitting only those chips to reach the pickup station (i.e., the end of the in-line feeder) which are properly oriented. A block 240 supports a pair of light-transmitting elements 242, 244, which may be optical filbers. The elements 242, 244 extend below the block, and are oriented so that light directed through one fiber 242 can be reflected from the upper surface of a resistor chip 246 and thereby directed through the other fiber 244.

The block 240 is mounted on a support 250 at one side of the in-line feeder. A conduit 252 in the support 250 is connected to the air supply 174 (FIG. 16), and the outlet of the conduit is located to direct air from the supply against a chip 246 beneath the fibers 242, 244, and force such chip to fall off the in-line feeder nd back into the vibrating bowl.

The conduit 252 is normally cut off from the air supply, and is selectively connected thereto via a solenoid valve (not shown) controlled by a photoelectric control circuit 256 to which the fiber 244 is connected. The solenoid valve may be like those disclosed in the aforementioned patent.

In one example, the circuit 256 prevents the air supply from being connected to the conduit 252 except when the resistive face of a chip 246 under the fibers 242, 244 is uppermost. Such resistive face is darker than the other face of the chip, and prevents light from being passed through the fiber 244 to the control circuit 256. The circuit functions under this condition to operate the associated solenoid and permit air to pass through the conduit 252 and force the chip off the in-line feeder so that it falls into the bowl.

In detector apparatus as above described, the fibers may be positioned with their lower ends at any desired chip position in advance of the pickup station. Additionally, connecting the photoelectric control circuit 256 to the power supply 172 via switches 182 conditions the detector apparatus for operation only while the spider is positioned to undergo vertical movement.

I claim:

1. In combination:

a pickup station, a test station and a drop station for electrical elements,
said stations being horizontally spaced along an arc of a circle;

means for moving electrical elements in single file to said pickup station;

a vertical shaft rotatable on the axis of the circle;

a spider carried by said shaft and having a number of arms movable above said stations;

a vacuum pickup device carried by each arm and adapted to be moved along the arc above said stations;

means to effect stepwise angular movement of said shaft so that each pickup device successively stops above said pickup, test and drop stations;

means operable at the end of each stepwise shaft movement to lower and then raise the shaft,
each pickup device being adapted when lowered at the pickup station to engage an electrical element thereat, said raising and lowering means being operable to keep said shaft in its upper position during stepwise angular movement thereof;

means to connect each pickup device to a vacuum source when it reaches its position above the pickup station, and to cut off its connection to the vacuum source when it reaches its position above the drop station;

each pickup device retaining by suction an element engaged thereby at the pickup station until it reaches its position above the drop station, where the element is released when the pickup is cut off from the vacuum source;

contacts for engaging an element carried by a pickup device at spaced points when such pickup device is lowered at the test station,
wherein said contacts include a respective contact carried by each pickup device for engaging an electrical element thereon, and a contact fixed on said post;

wiper contact means movable with said spider;

a stationary contact engageable by said wiper contact means during vertical movement of said spider;

means operable while each pickup device is at the test station to conductively connect the contact carried thereby to said wiper contact means;

measuring means coupled to said contacts for developing a signal representative of a predetermined electrical characteristic of an element;

and means operable by said measuring means for sorting elements released at the drop station into groups in accordance with the measurements of the predetermined electrical characteristic thereof made at the test station.

2. The combination of claim 1, including means for scanning elements moving toward said pickup station, said scanning means being operable to distinguish which surface of an element is facing up;

and means operable by said scanning means to remove from the line of elements moving toward said pickup station those elements which do not have a predetermined surface facing up.

3. In combination:

a pickup station, a test station and a drop station for electrical elements, said stations being horizontally spaced along an arc of a circle;

means for moving electrical elements in single file to said pickup station, including a vibratable bowl having a spiral ramp along which elements are movable, and a vibratable in-line feeder onto which elements pass off said ramp, said in-line feeder having an end stop;

a vertical shaft rotatable on the axis of the circle;

a spider carried by said shaft and having a number of arms movable above said stations;

a vacuum pickup device carried by each arm and adapted to be moved along the arc above said stations;

means to effect stepwise angular movement of said shaft so that each pickup device successively stops above said pickup, test and drop stations;

means operable at the end of each stepwise shaft movement to lower and then raise the shaft, each pickup device at the pickup station engaging the element adjacent said stop when said shaft is lowered, the major portion of said in-line feeder being inclined and having an inner lip against which the elements ride, the portion of said in-line feeder immediately adjacent said stop being horizontal, said lowering and raising means being operable to maintain said shaft in its upper position during stepwise angular movement thereof;

means to connect each pickup device to a vacuum source when it reaches its position above the pickup station, and to cut off its connection to the vacuum source when it reaches its position above the drop station, each pickup device retaining by suction an element engaged thereby at the pickup station until it reaches its position above the drop station, where the element is released when the pickup device is cut off from the vacuum source;

a post at said test station;

contacts mounted on said post for engaging an element carried by a pickup device at spaced points when such pickup device is lowered at the test station;

measuring means coupled to said contacts for developing a signal representative of a predetermined electrical characteristic of an element;

and means operable by said measuring means for sorting elements released at the drop station into groups in accordance with the measurements of the predetermined electrical characteristics thereof made at the test station.

4. The combination of claim 3, wherein said means for moving electrical elements includes a vibratable bowl and a straight feeder block along which elements move from said bowl, the end of said block being the pickup station;

a stop at the end of said block to be engaged by the element in front of the file moving along said block;

said scanning means including means above said block for directing a beam of light onto elements passing along said block;

means for receiving light reflected from the elements;

a network including photoelectric means coupled to said light receiving means;

a conduit positioned to direct air against an element onto which light is directed;

and means selectively operable by said network for connecting said conduit to a source of air, said photoelectric means being responsive to light of predetermined intensity from said light receiving means to operate said network and cause said selectively operable means to connect said conduit to the air source to force the scanned element off said block and into the bowl.

5. In combination:

a housing;

a vertical shaft having its lower end extending into and supported in said housing for rotational and axial movement;

means normally biasing said shaft to a lower position;

an input drive shaft rotatable in said housing;

gear means continuously rotatable from said drive shaft;

a pivoted L-shaped lever having one leg engaging said shaft;

a cam engaging the other leg of said lever and continuously rotatable by said gear means, said cam during each operation causing said lever to hold said vertical shaft to an upper position for a predetermined interval of each rotation of said cam, said biasing means forcing said vertical shaft to the lower position between intervals;

means coupling said gear means and vertical shaft to effect predetermined angular rotation of such shaft during each interval;

a multi-arm spider on the upper end of said vertical shaft;

a vacuum pickup device on each arm;

and means to successively connect each pickup device to a vacuum source throughout a predetermined number of said intervals including a cylindrical block, said block having a port for connection to a vacuum source, said block having a first groove of predetermined length in its lateral face that is concentric with the axis of said block, said port being in fluid communication with said groove, said block having its lateral face grooved to a depth less that that of said first groove and extending from said first groove;

a seal on said lateral surface surrounding the grooves therein;

a sleeve around said block and rotatable by said shaft, said sleeve sealingly engaging said seal;

said sleeve having a plurality of openings successively moving in alignment with said first groove during angular rotation of said shaft, and each successively moving in alignment with the shallower grooved face portion during successive movements of said vertical shaft to its lower position, whereby each sleeve opening remains in communication with the vacuum source as it traverses the length of said first groove, and is cut off from the vacuum source as it traverses the portion of the block between the ends of said first groove;

and a respective conduit connected between each sleeve opening and one of said vacuum pickup devices.

6. The combination of claim 5, wherein said vertical shaft extends through said cylindrical block.

7. The combination of claim 6, wherein each pickup device includes a tubular element extending through an arm of the spider;

a plunger extending through said tubular element, the upper end of said plunger being connected to one end of the conduit that connects the pickup device to an opening in said sleeve, said plunger having a flange spaced from its lower end;

and a compression spring between said flange and the lower end of said tubular element.

8. The combination of claim 7, including a plastic sleeve on the lower end of said plunger, the lower end of said plastic sleeve extending below the lower end of said plunger;

and a snap ring on the portion of said plunger extending above said tubular element, said tubular element being slidable in the spider arm through which it extends.

9. In combination:

a vertical cylindrical block, said block having a port for connection to a vacuum source, said block having a first groove of predetermined length in its lateral face that is concentric with the axis of said block, said port being in fluid communication with said groove, said block having face grooving shallower than and extending from and below said first groove;

a seal attached to the lateral face of said block and surrounding the face grooves therein;

a vertical sleeve surrounding said block and rotatable and axially slidable thereon, said sleeve being sealingly engaged by said seal;

means to rotate said sleeve in steps;

means operable at the end of each step to lower and then raise said sleeve axially;

and said sleeve having a plurality of openings therein successively moving in alignment with said first groove during rotation of said sleeve, and each successively moving in alignment with said shallower face grooving during successive vertical movements of said sleeve.

* * * * *